Patented Nov. 1, 1938

2,135,264

UNITED STATES PATENT OFFICE 2,135,264

PROCESS OF MAKING TOUGH STYROL POLYMERS AND PRODUCT

Omar H. Smith, West Englewood, N. J., assignor, by mesne assignments, to Carbide and Carbon Chemicals Corporation, New York, N. Y., a corporation of New York No Drawing. Application February 6, 1932, Serial No. 591,453. Renewed October 24, 1936

16 Claims. (Cl. 260—2)

This invention relates to a process for making tough styrol polymers, and more particularly to a process for making such tough polymers with improved properties, whether the styrols used in the process are produced by heating halogen alkyl benzols in the presence of a base or are produced by ordinary cracking methods. It further relates to the product obtained.

This application is a continuation in part of my application Serial No. 365,794, filed May 24, 1929, now Patent No. 1,908,549, May 9, 1933.

Styrols have been produced by various processes, and various processes are known for polymerizing such styrols, some of which latter processes produce the tough or alpha polymer or meta styrol, while others produce a brittle polymer. However, up to the present time known practical applications of the latter are limited as compared wtih the tough polymer. In Patent No. 1,926,314, dated September 12, 1933, I have disclosed a method for making a styrol by heating a halogen alkyl benzol in the presence of a base under atmospheric pressure. When the styrol thus formed has been polymerized by the methods previously used for producing a tough polymer, it has instead produced a brittle polymer. While applicant does not definitely know why such styrols, produced by heating a halogen alkyl benzol in the presence of a base, form brittle polymers when polymerized by methods ordinarily producing a tough polymer, and he does not wish to be bound by any theory, he believes that possibly this difficulty may be caused by residual halogen.

An object of the invention is to provide a process for making a tough styrol polymer of improved properties from an unpolymerized styrol capable of producing a tough polymer under previously known proper working conditions. A further object is to provide a process for making a tough styrol polymer from an unpolymerized styrol which will ordinarily produce a brittle polymer under any of the previously known working conditions. A still further object is to produce a styrol polymer of greatly improved properties. Other objects will appear from the detailed disclosure in the specification and claims.

The invention consists broadly in polymerizing a styrol to a tough polymer of improved qualities by heating the styrol in the presence of a liquid which is immiscible with the styrol and which boils at a temperature not substantially higher than 120° C., such as water, using as a raw material either a styrol obtained by heating a halogen alkyl benzol in the presence of a base or a styrol obtained in the ordinary manner by the usual cracking processes.

When styrol, as obtained from halogen alkyl benzol by heating in the presence of a base, has been polymerized by the previously known methods for producing a tough polymer, a brittle polymer has invariably been obtained instead of the expected tough polymer. But I have found that when the same styrol is polymerized in the presence of water, a tough and improved polymer is obtained when other suitable conditions for obtaining the tough polymer are present. In addition, I have also found that by heating with water a styrol obtained by the usual cracking processes, a- by cracking ethyl benzol, and which would ordinarily give a tough polymer under proper polymerizing conditions, I have obtained a tough polymer of greatly improved characteristics.

The following examples will illustrate the results obtained when carrying out my process, using either a styrol obtained by heating a halogen alkyl benzol in the presence of a base, or using a styrol obtained by the usual cracking processes, such as by cracking ethyl benzol.

Ex. 1 (blank).—A 24 gram sample of styrol solution, obtained by heating chlor ethyl benzol at atmospheric pressure in the presence of pyridine, was polymerized by heating for 72 hours under a reflux condenser at a temperature between 115° and 120° C., this solution having a concentration of about 45% to 50% styrol. No water was used, and 10.5 grams of brittle resin were obtained.

Ex. 2. (blank).—A 70 gram sample of a similarly obtained styrol solution having a concentration of 45% to 50% and a boiling point below 160° C. was polymerized by heating under a reflux condenser at atmospheric pressure for 136 hours at 80° to 100° C. The resulting resin was isolated by removal of the volatile hydrocarbons by steam distillation, and dried in an electric oven at 60° C. No water was used during polymerization, and 38 grams of brittle resin were obtained.

Ex. 3.—A 28 gram sample of similarly prepared styrol solution having a concentration of 50% and a boiling point below 160° C. was added to approximately 60 grams of water, and the mixture was heated for 72 hours under a reflux condenser while boiling the water. The resulting polymer was isolated by removal of the volatile hydrocarbons by steam distillation, and dried in an electric oven at 70° C., and 11 grams of a tough non-brittle resin were obtained.

*Ex. 4.*—In this example there were used 87 grams of a 52% solution of styrol obtained in the ordinary manner by a cracking process, the starting material being ethyl benzol. Such styrol when polymerized by the usual methods used for obtaining a tough polymer would produce a tough polymer. To the 87 grams of styrol solution there was added an equal amount of water and the mixture was heated under a reflux condenser with the water boiling for 92 hours. The water was then separated from the mixture and the solvent removed by drying in vacuum at about 120° C. There were obtained 34 grams of tough polymerized styrol.

As showing the improved characteristics of the tough product obtained in Example 4 over a similar tough styrol polymerized in the absence of water, the material was molded and given the usual tests for breaking strength and flexibility. It showed a transverse breaking strength, or modulus of rupture, of 10,800 pounds per square inch and a flexibility index of 656. A blank from the same styrol which was polymerized to a tough polymer by the usual procedure in the absence of water gave a transverse breaking strength of only 8000 pounds per square inch and a flexibility index of 280.

The transverse breaking strength and the flexibility index of the polymerized styrol may be measured as follows:

A molded strip of the material is supported horizontally on two parallel knife edges 3 inches apart, to form a simple beam. It is then subjected to an increasing load, applied by means of a third knife edge at the center of the beam, until the strip breaks. The breaking strength is then readily calculated in known manner from the observed breaking load, the dimensions of the test piece, and the distance between the supports. The maximum deflection of the third knife edge (in mils) is a measure of the flexibility of the material being tested. For convenience, the test piece used is a strip of rectangular uniform cross-section, approximately 0.09 inch by 0.5 inch by 4 inches in size. For strips having only a small deviation in thickness, there is an approximately linear relation between the thickness and the reciprocal of the maximum deflection. The term "flexibility index" as used in the specification and claims expresses the calculated maximum deflection, in mils, of a uniform rectangular strip 0.09 inch in thickness supported by two knife edges 3 inches apart, as described above.

By previously known methods of polymerizing styrol, it has been possible to obtain styrol polymers having a maximum breaking strength of only about 8000 pounds per square inch and a flexibility index of only about 300. By the process of the present invention styrol polymers may be produced which are characterized by breaking strength substantially in excess of 9000 pounds per square inch and a flexibility index substantially in excess of 300. Usually these products have a transverse breaking strength of from 10,000 to 16,000 pounds per square inch and a flexibility index of from 400 to 1000.

*Ex. 5.*—In this example a 60% solution of styrol (500 grams), as obtained by cracking ethyl benzol, was mixed with 250 grams of water, and the mixture heated for 96 hours with the water boiling. The meta styrol was isolated as before and a slab molded from it. The transverse breaking strength was 15,200 pounds per square inch, and the flexibility index was 900.

In carrying out the process the styrol solution used should have a concentration of approximately 40% to 90%. The temperature of the styrol-water mixture may be maintained at less than 100° C., and improved results still obtained. However, best results have been obtained when sufficient heat is applied to boil the water fairly vigorously, so as to obtain an efficient intermingling of the two immiscible liquid phases.

While the water may have other beneficial effects, it is believed that one important advantage in its use is that the water serves as an absorber of the heat evolved during the polymerization, which is an exothermic reaction, thus providing efficient control of the temperature of the reaction mixture. The steam formed when the water is boiled vigorously also serves to displace the air above the liquid mixture from the containing vessel and to prevent access of oxygen to the reaction mixture. Equivalent liquids may be substituted for water in this process. The use of an efficient reflux condenser is desirable. While the water used may be as low as 5% of the weight of the styrol solution, it is preferred to use from about 10% to about 100% by weight of water.

In general, the time required for carrying out the polymerization varies from approximately 70 to 150 hours, depending on the styrol concentration, the temperature, and other variables.

The process is also applicable to the polymerization of homologues of styrol, such as meta ethyl styrol, meta 2-methyl styrol, and the like, described in patent to Ostromislensky No. 1,683,402, granted September 4, 1928.

From the above, it will be seen that even in the case of styrol, such as that obtained by cracking ethyl benzol, which will give a tough polymer when polymerized by the usual methods, a greatly improved result has been obtained by the present process of polymerizing in the presence of water.

At the same time, the process enables a tough polymer to be obtained from a styrol derived from a halogen alkyl benzol, which ordinarily would give a brittle polymer if polymerized by the usual method employed for obtaining a tough polymer.

The process is simple and in addition to the advantages above set forth, it gives a good yield of the polymer. While specific examples of the process have been given as illustrations, it is obvious that changes may be made in its details without departing from the scope of the invention as defined by the appended claims.

I claim:

1. The process of producing a tough alpha meta styrol of increased strength and flexibility, which comprises adding water to a solution of a styrol of not less than approximately 40% concentration, in an amount not less than 5% by weight of said solution, effecting an intimate and continuous intermingling of the two immiscible liquid phases by heating, and continuing said heating until a tough styrol polymer is produced.

2. The process of producing a tough alpha meta styrol of increased strength and flexibility, which comprises adding water to a solution of a styrol of not over approximately 90% concentration, in an amount not less than 5% by weight of said solution, effecting an intimate and continuous intermingling of the two immiscible liquid phases by heating, and continuing said heating until a tough styrol polymer is produced.

3. The process of producing a tough alpha meta styrol of increased strength and flexibility, which comprises adding water to a solution of a styrol of approximately 40 to 90% concentration, in an amount not less than 5% by weight of said solution, effecting an intimate and continuous intermingling of the two immiscible liquid phases by heating, and continuing said heating until a tough styrol polymer is produced.

4. The process of producing a tough alpha meta styrol of increased strength and flexibility, which comprises adding water to a solution of a styrol of approximately 40 to 90% concentration, in an amount not less than 5% by weight of said solution, effecting an intimate and continuous intermingling of the two immiscible liquid phases by heating to not substantially less than the boiling point of the water, and continuing said heating for approximately 70 to 150 hours to produce a tough styrol polymer.

5. The process of polymerizing a styrol to produce a tough alpha polymer of increased strength and flexibility, which comprises adding water to a styrol solution of above 40% concentration, in an amount not less than 5% by weight of said solution, effecting an intimate and continuous intermingling of the two immiscible liquid phases by heating at not substantially below 100° C., and continuing said heating until a tough styrol polymer is produced.

6. The process of polymerizing a styrol to produce a tough alpha polymer which comprises adding water to a styrol solution of not substantially less than 40% concentration, in an amount not less than 5% by weight of said solution, effecting an intimate and continuous intermingling of the two immiscible liquid phases by heating at the boiling point of the water and at approximately atmospheric pressure, and continuing said heating for substantially 92 hours to produce a tough styrol polymer, separating out the water, and removing solvent by drying in vacuum above the boiling point of water.

7. The process of polymerizing a styrol to produce a tough alpha polymer, which comprises adding water to a styrol, derived from a halogen alkyl benzol, in a solution of not substantially less than 40% styrol concentration, the water being not less than 5% by weight of the styrol solution, effecting an intimate and continuous intermingling of the two immiscible liquid phases by heating at not substantially less than 100° C. and at atmospheric pressure, and continuing said heating until a tough styrol polymer is produced.

8. The process of polymerizing a styrol to produce a tough alpha polymer, which comprises adding water to a styrol solution of not substantially less than 40% concentration in an amount not less than 5% by weight of said solution, and heating under a reflux condenser to vigorously reflux the mixture until a tough styrol polymer is produced.

9. The process of polymerizing a styrol to produce a tough alpha polymer, which comprises vigorously refluxing a mixture of added water and a styrol solution of approximately 40% to 90% concentration until a tough styrol polymer is produced, the water being not less than 5% by weight of the styrol solution.

10. The process of polymerizing a styrol to produce a tough alpha polymer, which comprises vigorously refluxing a mixture of added water and a styrol solution of approximately 40% to 90% concentration for approximately 70 to 150 hours, the water being not less than 5% by weight of the styrol solution.

11. The process of polymerizing styrol to a tough alpha polymer, which comprises adding to a styrol solution, of not substantially less than 40% concentration, not less than 5% by weight of water based on the styrol solution, refluxing vigorously for not less than approximately 70 hours and until a tough polymer is produced, and removing water and solvent.

12. The process of polymerizing styrol to a tough alpha polymer, which comprises adding to a styrol solution, of approximately 40% to 90% concentration, not less than 10% by weight of water based on the styrol solution, heating to boiling under a reflux condenser for approximately 70 to 150 hours to produce a tough styrol polymer, and removing water and solvent.

13. The process of polymerizing a styrol to produce a tough alpha polymer, which comprises heating the styrol in a solution of not over approximately 90% concentration and at below approximately 120° C., removing heat caused by the exothermic polymerizing reaction by direct contact of the solution with water during polymerizing in an amount not less than 5% by weight of the solution, and continuing said heating until a tough styrol polymer is produced.

14. A tough, strong and flexible styrol resin having a transverse breaking strength not substantially less than 12,000 pounds per square inch, said resin being substantially identical with the product formed by the process of claim 1.

15. A tough, strong and flexible styrol resin having a flexibility index not substantially less than 600, said resin being substantially identical with the product formed by polymerizing a styrol in a solution of not over 90% concentration at atmospheric pressure in mechanical admixture with a body of water not less than 5% by weight of the styrol solution, and at a temperature of 100° to 120° C.

16. A tough, strong and flexible styrol resin having a flexibility index in excess of 900, said resin being substantially identical with the product formed by polymerizing a styrol in a solution of not less than 40% concentration at atmospheric pressure in mechanical admixture with a body of water not less than 5% by weight of the styrol solution, and at a temperature of 100° to 120° C.

OMAR H. SMITH.